UNITED STATES PATENT OFFICE.

WILLIAM A. HALL, OF BELLOWS FALLS, VERMONT.

CALCIMINE COMPOUND.

SPECIFICATION forming part of Letters Patent No. 651,851, dated June 19, 1900.

Application filed April 8, 1899. Renewed April 23, 1900. Serial No. 13,983. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Calcimine Compounds, of which the following is a specification, reference being had therein to the accompanying drawings.

Calcimine heretofore generally in use consists of a base of powdered chalk or whiting mixed with water in which a quantity of glue has been dissolved, the glue serving as an adhesive. The use of glue in calcimine is, however, more or less objectionable, owing to its considerable expense and also owing to the fact that it deteriorates when exposed to the air on the walls, so that after a time the calcimine will rub off. Efforts have been made to employ casein as a substitute for glue in calcimines; but this has not heretofore been successfully accomplished because the casein does not jell, and the solutions thereof heretofore employed have been found to work too thin or watery, and the casein calcimines had much tendency to streak and show laps. Also these previous casein-calcimine solutions had much tendency to become partially insoluble, so that the calcimine was difficult to wash off when it was desired to remove it in redecorating. I have discovered, however, that by using an alkali consisting of borax and hydrate or carbonate of soda as a solvent for casein the latter will be prevented from becoming insoluble, and I have also discovered that by employing pulverized sea-moss as an artificial thickening to give the calcimine a suitable body a casein calcimine will be produced which will spread smoothly and evenly and will thus be prevented from working watery and "running."

My improved calcimine composition consists of the following ingredients, preferably in powdered or finely-ground form and in about the proportions (by weight) stated: Chalk or whiting, ninety-one and one-half parts; casein, six parts; sea-moss, one and one-half parts, and borax or a mixture of borax and soda, one part. Coloring-matter can be added when desired.

The borax acts not only as a solvent for the casein, but prevents decomposition for some days after it has been dissolved. If soda alone were used as a solvent, the solution would be liable to decompose, and if borax alone were used it would have a tendency to make the calcimine partially insoluble—not enough so, however, to be washable or to enable it to withstand the weather, but sufficiently so to prevent it from being easily washed off in redecorating. For these reasons the mixture of soda and borax as a solvent for the casein is preferable, although of course either the soda or borax alone can be employed as a solvent, but with somewhat inferior results, for the reasons just stated.

The sea-moss is an important ingredient of the calcimine compound or composition, as without it, so far as I have been able to demonstrate by experiment, it has been found impossible to employ casein successfully as an adhesive for the reason that without the sea-moss the base of the calcimine compound will settle almost immediately when the composition is mixed with water, even when frequently stirred, and will be too thin or watery when mixed to the proper consistency to be applied to the walls and will drag or spread unevenly if applied too thick. The artificial thickness imparted by the sea-moss permits the composition to be applied very thin, so as to give a thin, smooth, and even coating to the walls, the sea-moss supplying the tendency to jell which exists in calcimine compositions mixed with glue or gelatin.

The composition or mixture consisting of the ingredients above named in substantially the proportions above stated is shipped commercially as a dry powder and is made ready for use simply by mixing in either cold or hot water. If cold water be employed for mixing, the powdered or finely-ground composition will not dissolve so quickly as in warm water.

The advantages of employing casein in a calcimine compound in place of the glue commonly used are its cheapness, light color, great covering capacity, and the fact that, unlike glue, it does not deteriorate with age.

Having thus described my invention or discovery, I claim and desire to secure by Letters Patent—

1. A calcimine compound consisting of chalk or whiting, casein, sea-moss and an alkali, in substantially the proportions specified.

2. A calcimine compound consisting of chalk or whiting, casein, sea-moss and borax, in substantially the proportions specified.

3. A calcimine compound consisting of chalk or whiting, casein, sea-moss, borax and soda, in substantially the proportions specified.

In testimony whereof I affix my signature in the presence of two witnesses.

WILLIAM A. HALL.

Witnesses:
EDWARD SCHOPP,
CUSHING ADAMS.